United States Patent [19]
Seo et al.

[11] Patent Number: 6,097,592
[45] Date of Patent: Aug. 1, 2000

[54] SUPPORTING LEGS FOR A PORTABLE COMPUTER

[75] Inventors: Yeol-Gu Seo, Suwon; Sang-Rae Lee, Pyoungtaek, both of Rep. of Korea

[73] Assignee: SamSung Electronics Co., Ltd., Suwon, Rep. of Korea

[21] Appl. No.: 08/951,971

[22] Filed: Oct. 16, 1997

[30] Foreign Application Priority Data

Jan. 14, 1997 [KR] Rep. of Korea ........................... 97-913

[51] Int. Cl.$^7$ .................................................. H05K 5/00
[52] U.S. Cl. ........................ 361/683; 248/351; 248/918; 400/682
[58] Field of Search .................................... 361/683, 685, 361/686; 400/682, 472, 493, 681; 248/351, 688, 677, 676, 918, 456, 188, 188.2, 655, 656, 649

[56] References Cited

U.S. PATENT DOCUMENTS

| 4,516,508 | 5/1985 | Kako et al. ................................. 108/7 |
| 4,693,444 | 9/1987 | Williams et al. ........................ 248/653 |
| 4,773,783 | 9/1988 | Dickie ..................................... 400/682 |
| 5,293,300 | 3/1994 | Leung ..................................... 361/683 |
| 5,347,424 | 9/1994 | Akahane ................................. 361/680 |
| 5,583,744 | 12/1996 | Oguchi et al. .......................... 361/683 |
| 5,732,928 | 3/1998 | Chang ..................................... 248/688 |

*Primary Examiner*—Ramon O. Ramirez
*Assistant Examiner*—Kimberly Wood
*Attorney, Agent, or Firm*—Robert E. Bushnell, Esq.

[57] ABSTRACT

The present invention relates to the supporting legs of a portable computer. The legs can be rotated to raise the rear side of the computer and can be moved perpendicularly to their plane of rotation to allow various angles of rotation.

9 Claims, 9 Drawing Sheets

SUPPORTING LEGS FOR A PORTABLE COMPUTER

CLAIM OF PRIORITY

This application makes reference to, incorporates the same herein, and claims all rights accruing thereto under 35 U.S.C. §119 through my patent application entitled *A Portable Computer Having Supporting Legs* earlier filed in the Korean Industrial Property Office on the 14th day of January 1997 and there duly assigned Ser. No. 1997/913.

BACKGROUND OF THE INVENTION

1. Field of the Invention

The present invention relates to supporting legs for portable computers and, more particularly, to a portable computer that has supporting legs that endeavour to minimize the fatigue experienced by the hands of a user while typing.

2. Background Art

The importance of comfort while utilizing a keyboard or portable computer is not fully recognized in the art. One method of reducing the fatigue associated with the operation of a keyboard or a portable computer has been to raise the rear portion of the unit to provide the user with an inclined keyboard or portable computer surface to use. This has led to the development of many different supporting mechanisms. By way of example, U.S. Pat. No. 5,567,327 to Cheng entitled *Portable Computer with Supporting Legs*, discloses two rear supporting legs pivotally attached to the outside of a portable computer. U.S. Pat. No. 5,111,361 to Kobayaski entitled *Device Having a Slider Portion and a Stand Portion for Titling a Compact Electronic Apparatus*, discusses rear supporting legs for a laptop computer that slide into position.

U.S. Pat. No. 4,856,748 to Obermeyer entitled *Leg Assembly for a Keyboard or the Like*, mentions a hinge plate pivotally connected to the rear of a laptop computer to raise the keyboard. U.S. Pat. No. 5,574,446 to Dittrich entitled *Keyboard*, shows rear supporting legs mounted between web structures in a keyboard. U.S. Pat. No. 4,658,124 to Bertina entitled *Keyboard Having Variable Inclination of the Key Plane*, shows two supporting legs for a keyboard that are pivotally connected and capable of locking into different angles relative to the bottom of the keyboard. U.S. Pat. No. 4,592,528 to Still entitled *Leg Assembly for a Keyboard or the Like*, shows a keyboard with simple leg supports. I have observed that, as evidenced by these exemplars, that these supporting legs are not particularly easy to assemble, to use, or to manufacture.

SUMMARY OF THE INVENTION

It is an object of the present invention to provide a portable computer having supporting legs that are easy for the user to handle.

It is another object is to provide a portable computer having supporting legs that have a simplified structure that reduces the manufacturing cost of the computer and simplifies the steps involved in manufacturing the computer.

It is still another object to provide a portable computer having supporting legs that are moveable in a direction perpendicular to the plane of rotation of the legs in order to release the stabilizing features and allow the leg to pivot around the rotation axis.

It is yet another object to provide a portable computer positionable at various angles of inclination relative to an underlying surface such as a tabletop.

It is still yet another object to provide a portable computer having supporting legs that can be easily stored and transported.

These and other objects may be achieved with a portable computer that has a main body with recesses accommodating a pair of legs coaxially aligned on the sides of the main body for attaching a pair of supporting legs. Each recess has a bore with an inserted fastener to attach a leg. The supporting legs can be rotated into a deployed position to raise the rear side of the main body above the plane of any underlying surface such as a table top, and when the portable computer is being prepared for storage, rotated into stored position that is flush against the sides and rear wall of the main body of the portable computer. While in the stored position, the outer edges of the legs conform to the side and rear side walls of the computer to fill the voids of the recesses.

BRIEF DESCRIPTION OF THE DRAWINGS

A more complete appreciation of the invention, and many of the attendant advantages thereof will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 17:
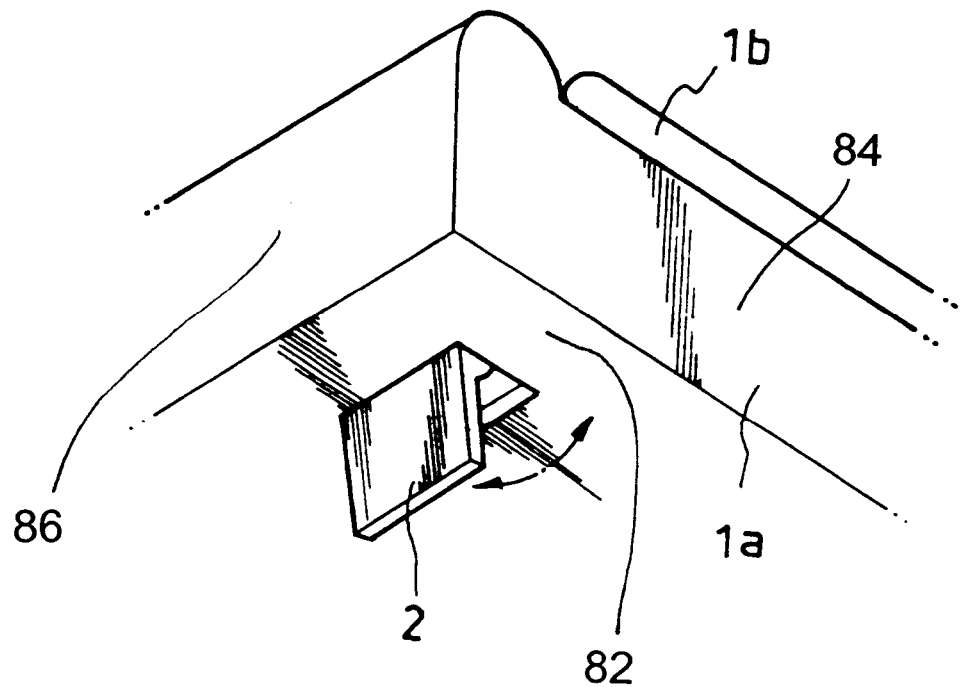
FIG. 17 is a partial perspective view of a typical leg supporting a portable computer.

Turning now to the drawings, FIG. 17 illustrates a typical portable computer that has a display unit 1b and a main body 1a. As shown in FIG. 17, the leg 2 is mounted on a bottom surface 82 of the portable computer's main body 1a and can be pivotally rotated to a supporting position that raises the rear portion of the main body 1a. I have found that these types of legs require the user to manually raise the computer and to then reach under the bottom of the keyboard before pivotally rotating the legs 2.

Figure 1:
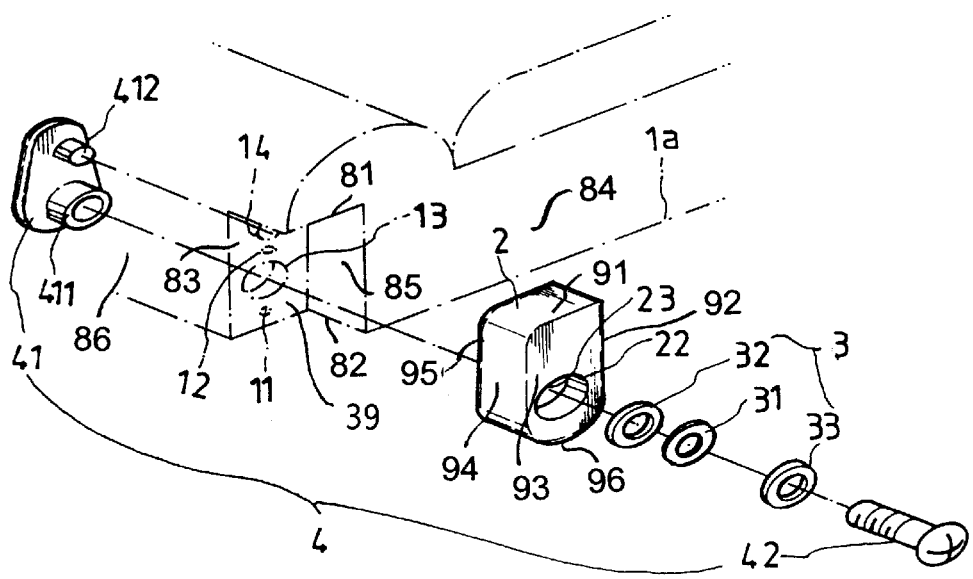
FIG. 1 is a partial exploded perspective view of a portable computer with legs constructed as a first embodiment according to the principles of the present invention.

FIG. 1 illustrates a portable computer and legs constructed as a first embodiment according to the principles of the present invention. As shown in FIG. 1, the portable computer and legs may be constructed with a main body 1a, housing a mother board for the computer, that has leg accommodating recesses 39 coaxially aligned on the sides 84 of the portable computer. One or more circular bores 13 and 14 are formed on the surface 83 of each leg accommodating recess that is parallel to the side 84 of the computer. A fastener 42 is inserted through the bore closest to the bottom of the laptop to attach a rotatable leg 2 to a surface 83 of the recess. The inner surface 95 of the rotatable leg 2 contacts the surface of the recess 83 that is parallel to the side 84 of the laptop. The leg can then be adjusted to raise the rear side of the main body 1a, which is attached to the leg using a connector 4. The connector 4 may be constructed with a spring washer 31, an inner washer 32, an outer washer 33, a fastener 42 and a fastener receptacle. The connector is assembled along the axis of rotation of the leg and allows for the leg to be moved outward from the main body 1a, in a direction perpendicular from the plane of rotation of the leg, to disengage the leg from one position and move it into another. The fastener receptacle allows for the design of the laptop's main body to be very simple because of the extra support it gives to the leg and also allows easier attachment of the leg.

Figure 3:
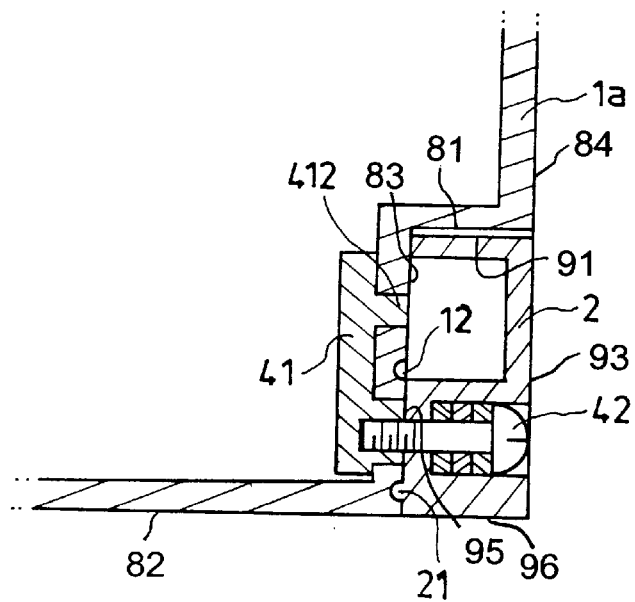
FIG. 3 is a partial sectional view of a portable computer with the legs shown in FIG. 1 located on the left and right sides of the computer.
Figure 4:
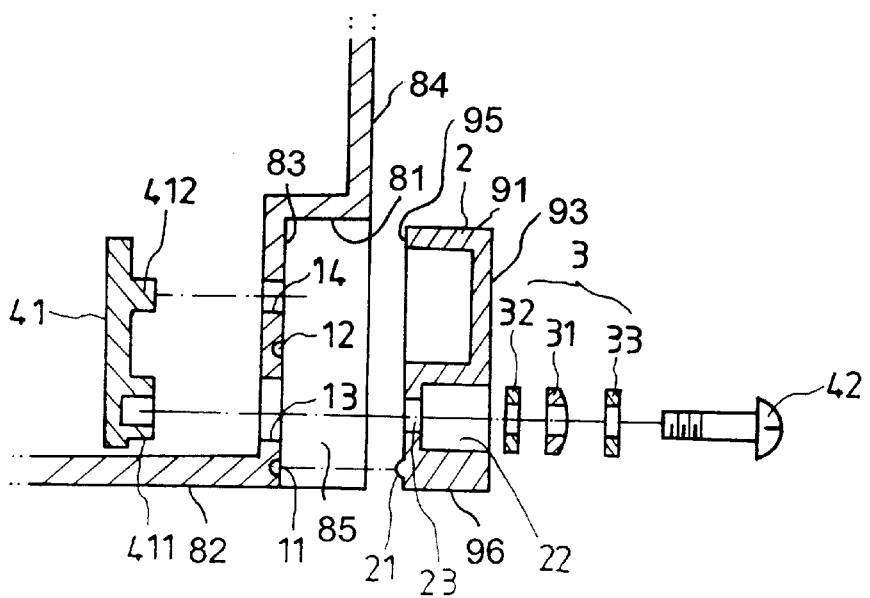
FIG. 4 is a partial sectional exploded view of the portable computer of FIG. 1 with a leg and connector.

As shown in FIGS. 3 and 4, a seating surface 22 is located inside a counterbored bore 23 that goes through the leg 2. This allows the spring washer, and inner and outer washers to be mounted inside the bore and then secured, along with the leg, to the main body 1a by a fastener 42. A detent 21 is located on the inner surface 95 of the leg 2, around the bore 23, to engage with the first and the second notches 11 and 12.

Figure 2:
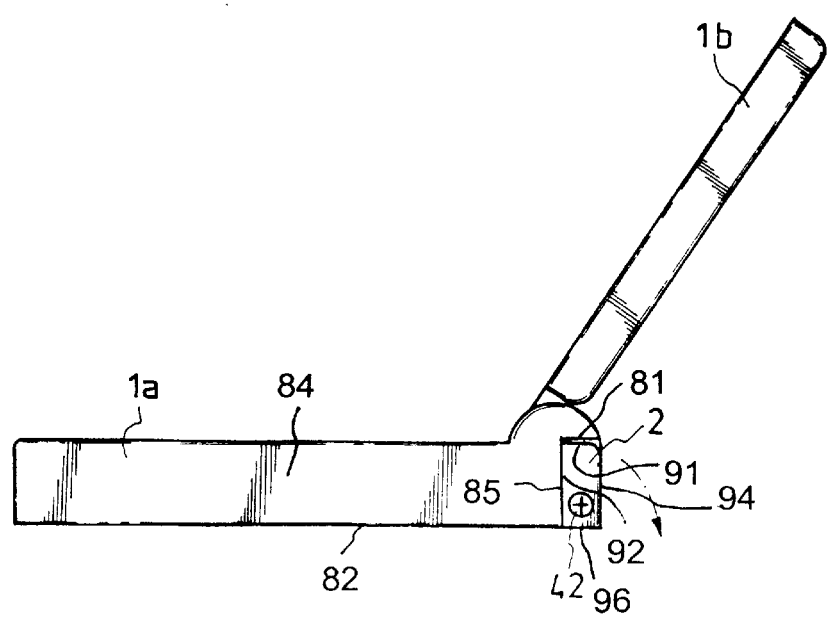
FIG. 2 is a side view of a portable computer with the legs shown in FIG. 1 pivotally attached on the sides of the computer.
Figure 5:
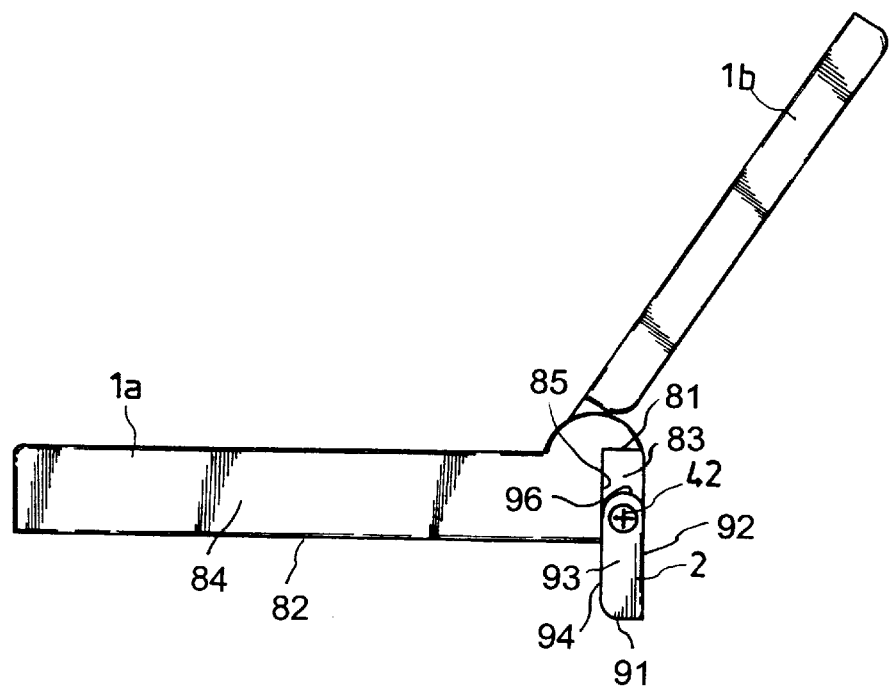
FIG. 5 is a side view of a portable computer of FIG. 1 showing the legs rotated to raise the rear side of the computer.
Figure 6:
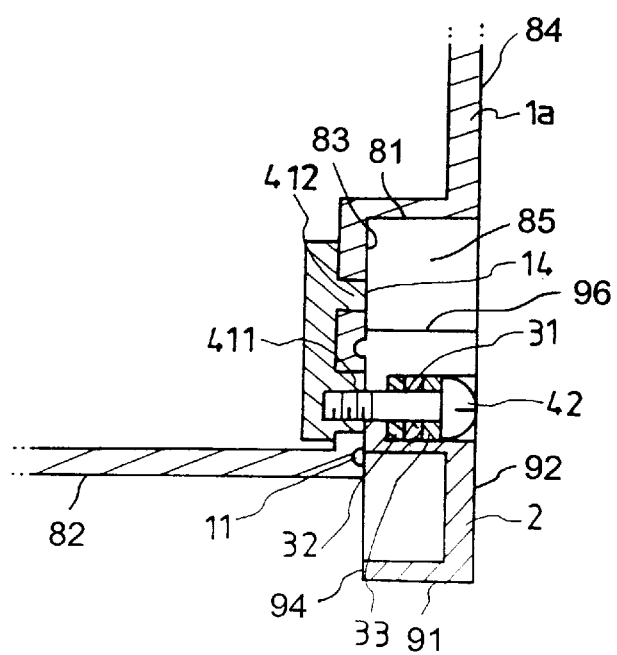
FIG. 6 is a partial sectional view of a portable computer with legs of FIG. 1, while in a rotated position.
Figure 7:
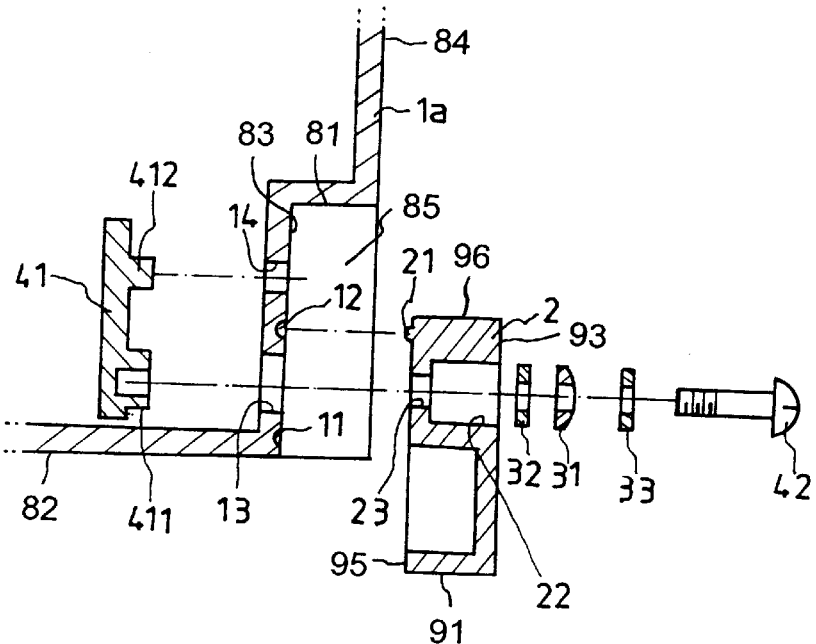
FIG. 7 is a partial sectional exploded view of a portable computer with the legs of FIG. 6 rotated to raise the rear of the computer.

FIG. 2 shows a side view of a portable computer with legs constructed according to the first embodiment and a display panel 1b. The legs can be rotated so that they are flush with the laptop. In this position, surface 94 of leg 2 and surface 86 of the laptop 1a, surface 96 of leg 2 and surface 82 of the laptop, and surface 93 of leg 2 and surface 84 of the laptop are respectively flush. To attach leg 2 to the portable computer, as shown in FIG. 1, the hollow boss 411 and the plug 412 of the fastener receptacle 41 are inserted into bore 13 into the main body and plug slot 14, respectively. Then washers 32 and 33 and spring washer 31 are inserted into the leg's bore 23 and positioned against the seating surface 22. Fastener 42 is inserted through outer washer 33, spring washer 31, inner washer 32, bore in leg 23, the bore 13 in the main body 1a, and the washer receptacle via the hollow boss. After attaching the leg 2 to the main body 1a, the detent 21 on surface 95 of the leg 2 is engaged by a first detent engaging notch 11 on surface 83 of the recess, thus preventing the leg 2 from accidentally rotating. When the user desires to rotate the leg 2, the user must first pull the leg in an outward direction to disengage the detent engaging notch from detent 11. Then the leg can be rotated to adjust the angle of inclination of the keyboard. FIG. 5 shows a side view of a portable computer that has leg 2 rotated so as to raise the computer. As shown in FIGS. 6 and 7, when leg 2 is fully rotated, detent 21 of leg 2 is engaged with second latch hole 12 thereby preventing leg 2 from being accidentally rotated.

Another modification within the scope of the invention depicts the leg 2 having a plurality of notches 11 and 12 located radially around the bore 23 on the inner surface of the leg 2. The main body 1a having a detent 21 located radially around the bore 13 on said outer surfaceof the main body 1a.

Figure 8:
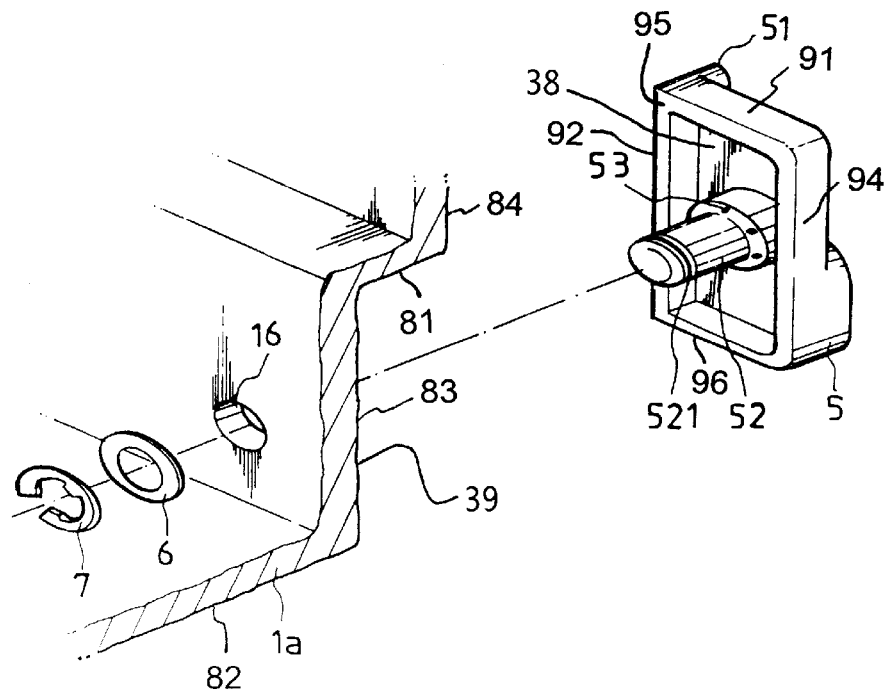
FIG. 8 is a partial exploded perspective view of the leg and a portable computer according to a second embodiment of the present invention.

FIG. 8 a portable computer with legs constructed as a second embodiment according to the principles of the present invention. The portable computer and legs may be constructed with a main body 1a, housing a mother board for the computer, that has a bore 16 located in surface 83 of each recess 39. As shown in FIG. 8, a pole 52 is attached on the inner surface of leg 5 inside a cavity 38 in its inner surface 95. A circumferential groove 521 is formed on the end of pole 52 to engage with connector 7. By attaching connector 7 to connecting groove 521, after the pole has been inserted through a circular bore 16 in surface 83 of the recess, leg 2 is attached to the main body 1a. In addition, a plurality of latching recesses 53 are formed on the circumferential seating surface that is formed on the pole 52. Leg 5 can further include a handle 51 on surface 93 to simplify the user's adjustment of leg 5.

A spring washer 6 or similar elastic member is attached between the connector 7 and the main body 1a. Using a spring washer allows the movement of the legs 5 in a direction perpendicular to the plane of rotation of the legs 5. The connector 7 could be an E-type ring, as shown in FIG. 8.

Figure 9:
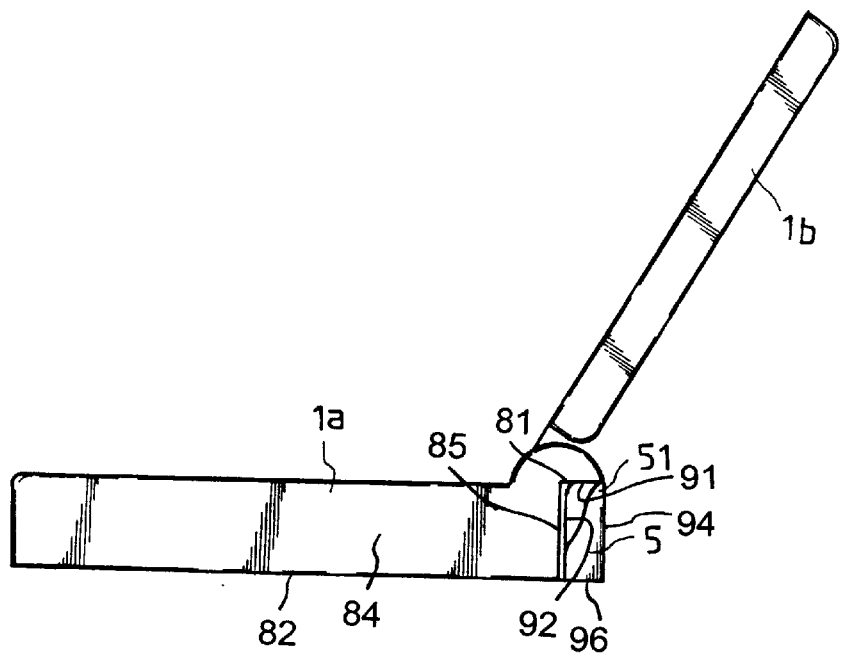
FIG. 9 is a side view of a portable computer with the legs shown in FIG. 8 located on the side walls of the computer.
Figure 10:
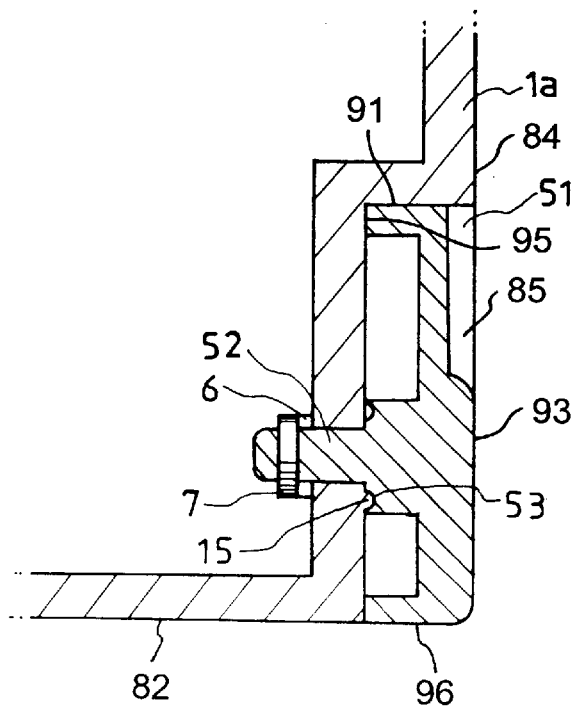
FIG. 10 is a partial sectional view of a portable computer with the legs shown in FIG. 8 located on the sides of the computer.

FIG. 9 shows a side view of a portable computer with legs constructed according to the second embodiment and a display unit 1b. The legs can be rotated so that they are flush with the laptop. In this position, surface 94 of the leg and a surface of the laptop, surface 96 of the leg and surface 82 of the laptop, and surface 93 of the leg and surface 84 of the laptop are flush. As shown in FIG. 10, the leg can be assembled by inserting the pole 52 of the leg 5 into the bore 16 of the main body. Then the spring washer 6 is attached around the pole 52, and an E-type ring 7 is attached to the circumferential groove 521 on the pole 52.

Figure 11:
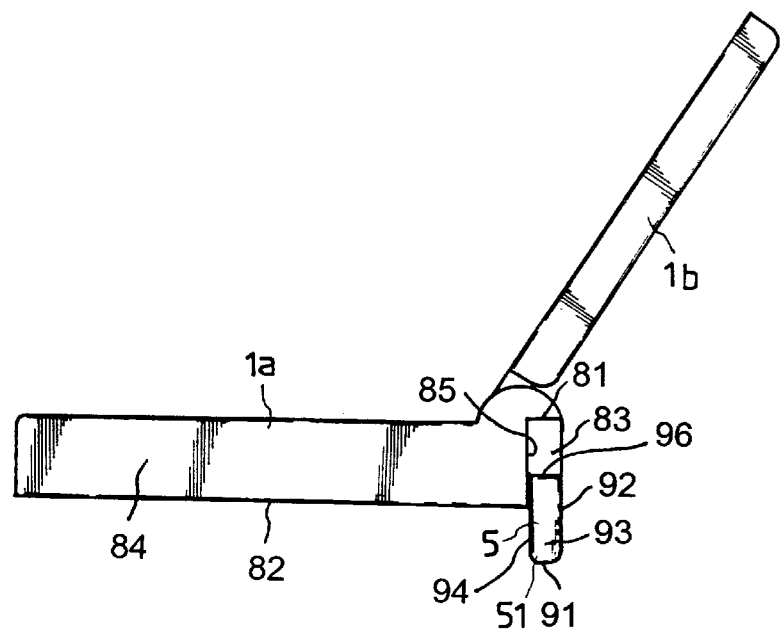
FIG. 11 is a side view of a portable computer with the legs of FIG. 8, rotated to raise the rear of the computer.

After attaching the leg to main body 1a, a protrusion 15 located on main body 1a is engaged with one of the plurality of latch holes 53 located on leg 5. This prevents leg 5 from accidentally rotating. When the user rotates leg 5 in order to raise the portable computer, leg 5 must first be outwardly displaced, to disengage the protrusion 15 from a latch hole 53. After rotation, the protrusion 15 is re-engaged with another latching recess 53 and held in place by the restoring force of the spring washer 6. This allows the portable computer to be raised discretely depending on the angle of the leg 5 relative to the base of the computer. FIG. 11 shows a side view of the portable computer, that has its leg 5 rotated 180 degrees to fully raise the rear portion of the computer.

Figure 12:
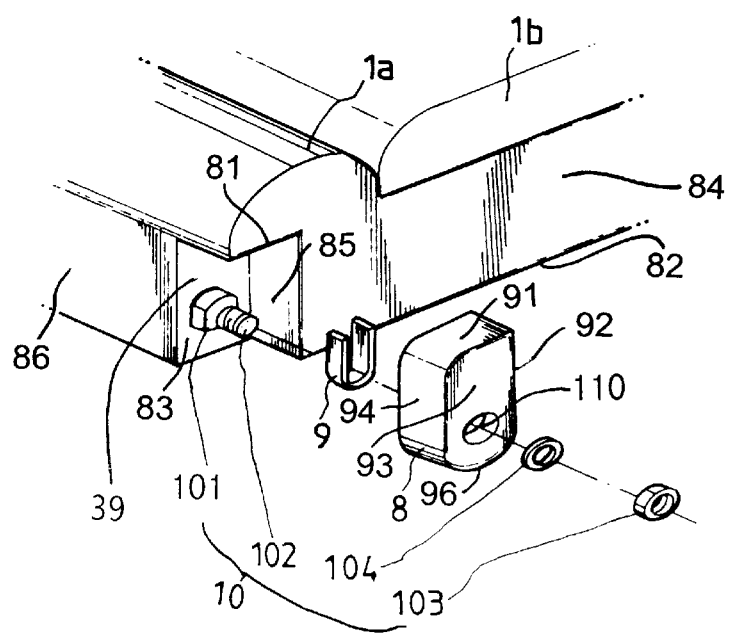
FIG. 12 is a partial exploded perspective view of a portable computer supported by legs constructed as a third embodiment according to the principles of the present invention.

FIG. 12 illustrates a portable computer with legs constructed as a third embodiment according to the principles of the present invention. The legs can be rotated so that they are flush with the laptop. In this position, surface 94 of the leg and surface 86 of the laptop, surface 96 of the leg and surface 82 of the laptop, and surface 93 of the leg and surface 84 of the laptop are flush. The portable computer and legs may be constructed with a main body 1a, housing a mother board for the computer. The main body has coaxially aligned recesses that have an outwardly protruding elliptical member 101, located on surface 83, with an attached bolt 102. A leg 8 is attached to the main body 1a using a connector 10. The connector may be composed of an elliptical member 101, located on surface 83, with an attached bolt 102, an elastic U-shaped member 9, a washer 104, and a nut 103. The elastic member 9 is mounted in the inside of the leg 8. The elastic member stabilizes the position of leg 8 by changing its shape depending on the rotation of the leg.

Figure 13:
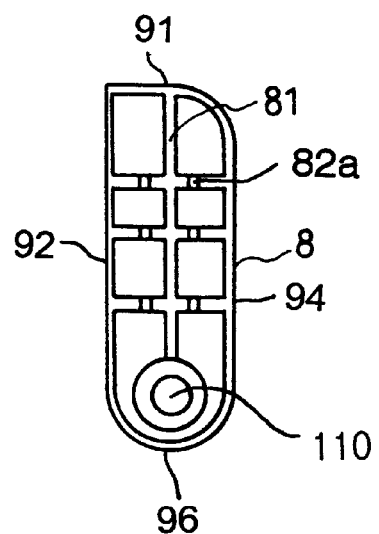
FIG. 13 is a longitudinal sectional view of the third embodiment of the legs shown in FIG. 12.
Figure 14:
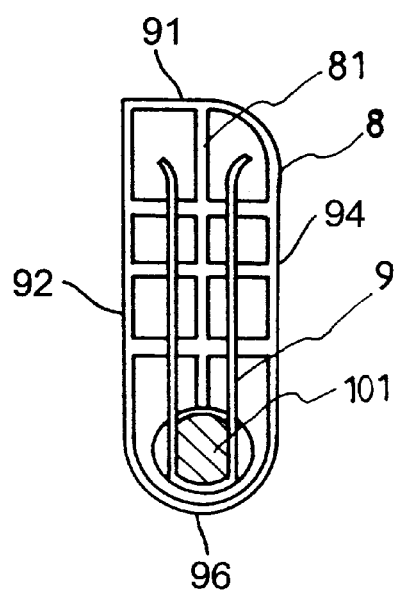
FIG. 14 is a longitudinal sectional view of the third embodiment shown in FIG. 12 bearing a mounted elastic member.
Figure 15:
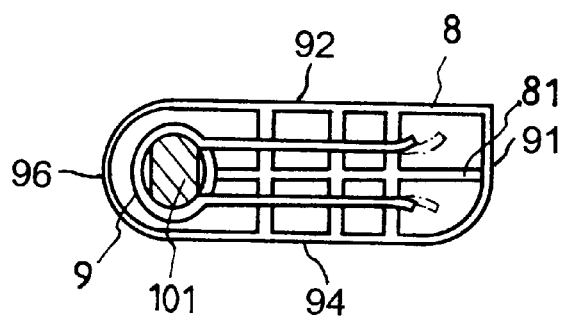
FIG. 15 shows the deformity of the elastic member when a leg of the third embodiment is rotated.
Figure 16:
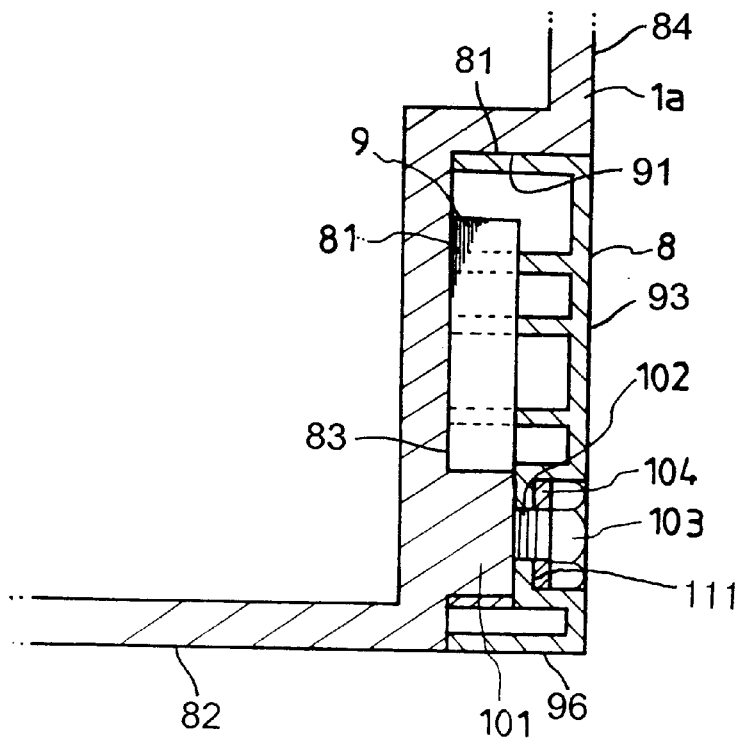
FIG. 16 is a partial longitudinal sectional view of a portable computer supported by the legs shown in FIG. 12 located on the side walls of the computer.

As shown in FIGS. 12 and 16, an elliptical shaped member 101 is located at one end of the bolt 102 to cause a deformation in the elastic U-shaped member 9 when the leg 8 is rotated. FIG. 13 shows a longitudinal sectional view of the leg 8. A rib 81 is located inside of the leg 8 to secure the elastic member 9. As shown in FIG. 14, the elastic member 9 is U-shaped, and the elliptical shaped member 101 is positioned inside the curved portion of the U-shaped elastic member 9. Even though the leg 8 is rotated by the user, the elliptical shaped member 101, which is fixed on the main body 1a, is not rotated. Therefore, when the leg 8 is rotated by 90 degrees, the shape of elastic member 9 is changed as shown in FIG. 15. And, when the leg 8 is rotated by 180 degrees, the elastic member 9 returns to its original U-shape. Thus, the leg 8 is rotated only when the user rotates the leg 8 with enough force to change the shape of the elliptical member 9.

To attach this embodiment of the legs 8 to the portable computer the elastic U-shaped member is inserted in the grooves 82a in the lattice structure 81 of the leg 8, as shown in FIG. 13. Then the leg 8 with attached elastic U-shaped member 9 are inserted over the bolt 102. The elastic U-shaped member is also snugly fitted around the elliptical protrusion 101 when the bolt is inserted into the bore 110 of the leg 8. Then, as shown in FIG. 16, the nut 103 is engaged with the end of the bolt 102 after a washer 104 has been inserted over the bolt. In the above described embodiments, the numbers of protrusions, and the shape of the elliptical shaped member, and detents or recesses can be modified within the scope of this invention. This invention allows the user to more easily manipulate a portable computer by raising the rear side of the portable computer. In addition, the legs have a simplified structure, that makes it possible to reduce the cost of manufacturing.

The foregoing paragraphs describe rear legs that support a portable computer, that have adjustable angles of inclination, that have a retractable position in which they are forced to flush with the portable computer, that are mounted on the outside of a portable computer, and that are outwardly movable in the direction perpendicular to the legs plane of rotation. I expect that such legs will be simpler to use, easier to assemble, and be easier to manufacture. Although this preferred embodiment of the present invention has been disclosed for illustrative purposes, those skilled in the art will appreciate that various modifications, additions and substitutions are possible, without departing from the scope and spirit of the invention as described in the accompanying claims. It is also possible that other benefits or uses of the currently disclosed invention will become apparent over time.

What is claimed is:

1. A portable computer, comprising:

a main body having coaxially aligned recesses on opposite sides at a rear of said main body, each recess of said coaxially aligned recesses having a first stabilizing feature on a planar surface, a first perforation, and a second perforation located above said first perforation and on the same planar surface as said first stabilizing feature;

a fastener receptacle having an oblong shape located inside said main body immediately opposite each said recess, said fastener receptacle having a hollow boss insertable into said first perforation of said main body, said hollow boss having a distal end flush with an outer surface of said main body, said fastener receptacle having a plug located above said hollow boss, said plug having a distal end flush in said second perforation of said main body;

a leg containing a counterbored bore, said leg having a second stabilizing feature on an inner surface engagable with said first stabilizing feature; and a lock pivotally attaching said leg to said main body.

2. The portable computer of claim 1, further comprising:

said first stabilizing feature being a plurality of notches located radially around said first perforation on said outer surface of said main body; and said second stabilizing feature being a detent radially located around said inner surface of said leg receivable within said notches.

3. The portable computer of claim 1, further comprising:

said first stabilizing feature being a detent radially located around said first perforation on said outer surface of said main body; and said second stabilizing feature being a plurality of notches located radially around said bore on said inner surface of said leg for receiving said detent.

4. The portable computer of claim 1, further comprised of said lock comprising:

a spring washer positioned between a first washer and a second washer, said first washer and said spring washer and said second washer being insertable into said counterbored bore of said leg; and a fastener connecting said leg to said main body through said spring washer and said first washer and said second washer.

5. The portable computer of claim 2, further comprised of said counterbored bore in said leg having a first inner diameter and a second inner diameter, said counterbored bore having a first segment adjacent to an outer surface of said leg, said first segment having a larger inner diameter than that of a second segment positioned adjacent to an inner surface of said leg, said first segment and said second segment forming a seating surface at an interface between the first segment and the second segment, said lock being placed against said seating surface.

6. The portable computer of claim 1, further comprised of each said recess accommodating one said leg and allowing said leg to flush with said main body when said leg is rotated to a fully retracted position.

7. The portable computer of claim 1, further comprised of said leg having a hollow inner surface.

8. The portable computer of claim 4, further comprised of said spring washer exerting an axial force along the length of said fastener, said spring washer being in a partially compressed condition while said leg supports said main body.

9. The portable computer of claim 1, further comprised of each said recess having a plurality of notches located radially around said first perforation allowing said leg to support said portable computer using various angles relative to a bottom of said main body.

* * * * *